June 29, 1926.
R. L. BALLOU
CAR COUPLER UNIT
Original Filed April 1, 1925
1,590,490
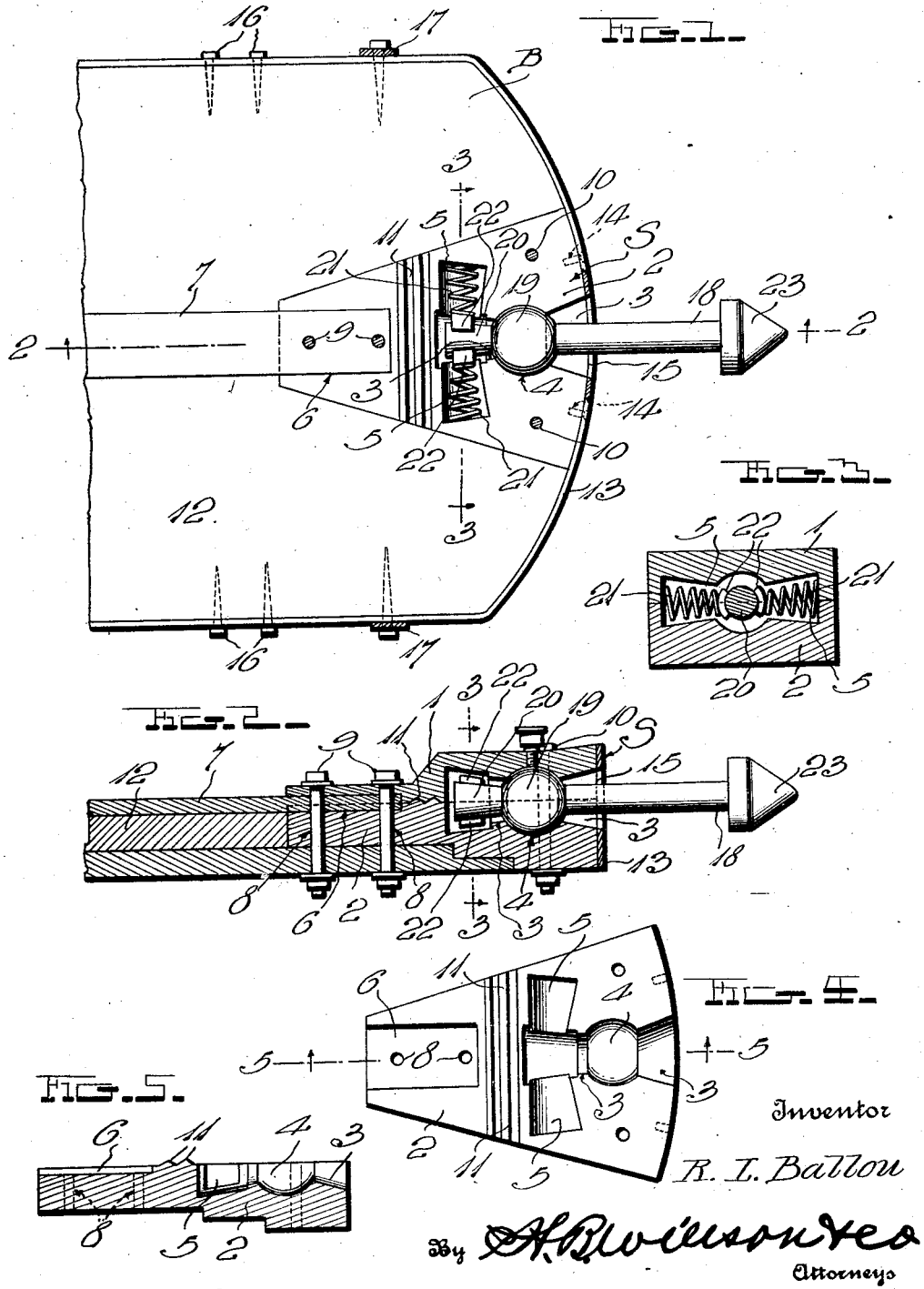

Patented June 29, 1926.

1,590,490

UNITED STATES PATENT OFFICE.

ROBERT LUCIEN BALLOU, OF HAZARD, KENTUCKY, ASSIGNOR OF ONE-THIRD TO ALBERT STACY, OF LOTHAIR, KENTUCKY, AND ONE-THIRD TO GEORGE D. STACY, OF HAZARD, KENTUCKY.

CAR-COUPLER UNIT.

Original application filed April 1, 1925, Serial No. 19,967. Divided and this application filed September 21, 1925. Serial No. 57,718.

This application relates primarily to car-couplers of the type intended for use on mine cars or analogous, comparatively small cars, for instance, those pulled by donkey engines for hauling drit. The application further relates to an improved coupler unit for use on one end of a car for co-action with another unit on the adjacent end of another car, and the subject matter to be protected by such application, is divisional of my parent U. S. application, filed April 1, 1925, Ser. No. 19,967.

The coupling unit to which the invention relates includes a shank having a preferably conical head for engagement with jaws on another coupler unit, the principal object of the invention being to provide unique, simply constructed means, for mounting said shank in a manner to permit universal movement thereof, thus insuring that the two units of the coupler shall properly engage each other and shall have any necessary relative movements, during operation of the cars.

Another object is to provide an improved coupler unit embodying a head in which an end of the shank is mounted, said head being of simple, sectional construction, easily manufactured and assembled, yet efficient in use.

With the foregoing and minor objects in view, the invention resides in the novel subject matter hereinafter described and claimed, the description being supplemented by the accompanying drawing.

Figure 1 is a top plan view with parts removed and in section.

Figure 2 is a central longitudinal sectional view as indicated by line 2—2 of Fig. 1.

Figure 3 is a transverse sectional view as indicated by line 3—3 of Figs. 1 and 2.

Figure 4 is a plan view of one section of the recessed head in which an end of the shank is mounted.

Figure 5 is a sectional view on line 5—5 of Fig. 4.

The improved shank-carrying coupler unit is designated in a general way at S. This unit S comprises a metal head which is formed of upper and lower sections 1 and 2, said sections being jointly recessed to provide a longitudinal passage 3 having a spherical portion 4 between its ends. The head sections 1 and 2 are also recessed to provide a pair of pockets 5 which open into opposite sides of the passage 3, in inwardly spaced relation with its spherical portion 4. In the preferred construction, the inner faces of the head sections 1 and 2 are provided with still further recesses 6 which jointly receive the outer end of a draw bar 7, and openings 8 are formed in said sections to receive bolts 9 which secure the draw bar in place as well as assisting in clamping the sections of the head together. Other bolts 10 have been shown passing through the outer portions of the head sections 1 and 2 to further secure them together, and to take strain from all of the bolts or other fasteners which might be used, the head sections are preferably formed with transverse, inter-engaging ribs 11, as shown clearly in Figs. 1, 2, 4 and 5.

A suitable number of the bolts which hold the sections of the head together, preferably pass also through portions 12 of the floor and bumper boards of the car which carries the unit S, the bumper being designated in a general way at B. The outer end of the head is flush with the outer transverse edge of the bumper B, and to generally reinforce the structure and protect the edges of the bumper, as well as providing effective anchoring means for the head, I provide a substantially U-shaped, horizontally disposed, metal plate 13 which extends along the edges of the bumper and the outer end of the head 1—2, the intermediate portion of this plate being secured by suitable fasteners 14 to said outer end of the head and being formed with an opening 15 which registers with the passage 3. The end portions of the plate 13 are secured to the side edges of the bumper and adjacent portions of the car body, for instance, by lag screws 16, and certain of these screws may well pass through a brace or hanger 17, the latter being preferably in the form of a stirrup to extend under the bumper B.

A shank 18 is provided to connect the coupler unit S with another coupler unit which constitutes the subject matter of the parent application above referred to, a portion of said shank being received in the passage 3 and being provided with an integral ball 19 which is received for rotary movement in any direction, in the spherical socket portion 4 of said passage 3. The inner extremity 20 of the shank 18 is preferably somewhat tapered as shown in Figs. 1 and 2, and springs 21 (preferably conical) disposed in the pockets 5, are provided to co-operate with said end 20 in normally centering the shank 18 when the two coupler units are disconnected from each other. Preferably, semi-circular shoes 22 are interposed between the inner ends of the springs 21 and the end 20 of the shank 18. It will be observed that both the inner and outer ends of the passage 3 are flared and that the shank 18 is thus free to have pivotal movement in all directions, about the ball 19. Moreover, this shank may freely rotate, thereby well adapting the improved coupler to use upon cars which are bodily inverted to discharge their loads. Whenever the two coupler units are disconnected from each other, the shank 18 is centered by the springs 21, so that its tapered head 23 is in readiness to properly engage the clutch unit.

It will be seen from the foregoing that a simple and inexpensive construction has been provided, yet one which will be highly efficient and in every way desirable.

I claim:

1. A car coupler unit comprising a head having a longitudinal passage provided between its ends with a spherical portion, said head having horizontally opposed pockets which open into said passage in inwardly spaced relation with its spherical portion, a coupling shank adapted for engagement with another coupling unit, said shank having a portion of its length received loosely in said passage and being provided with a ball received in said spherical passage portion, and centering springs for said shank disposed in said pockets and engaging the inner end portion of said shank.

2. A structure as specified in claim 1; together with semi-circular shoes interposed between said springs and the shank and engaging the latter in a manner to permit rotation thereof.

3. A structure as specified in claim 1; said head being formed of upper and lower sections secured together and jointly recessed to form said passage and said pockets, said sections having inter-engaging ribs taking strain from the means by which they are secured together.

4. A structure as specified in claim 1; said head being formed of upper and lower sections secured together and jointly recessed to form said passage and said pockets, said head also having a recess between its two sections and opening through the inner end of the head in which to secure a draw bar, the two sections of the head having openings to receive fasteners for securing the draw bar and for assisting in securing said sections together.

In testimony whereof, I have hereunto affixed my signature.

ROBERT LUCIEN BALLOU.